United States Patent [19]
Müntener

[11] Patent Number: 5,814,362
[45] Date of Patent: Sep. 29, 1998

[54] METHOD AND APPARATUS FOR REFINING CHOCOLATE MASS

[75] Inventor: Kurt Müntener, Bad Salzuflen, Germany

[73] Assignee: Richard Frisse GmbH, Bad Salzuflen, Germany

[21] Appl. No.: 866,897

[22] Filed: May 30, 1997

[30] Foreign Application Priority Data

Jun. 11, 1996 [DE] Germany .......................... 19623206.6

[51] Int. Cl.⁶ .............................. A23G 1/06; A23G 1/10
[52] U.S. Cl. .......................... 426/231; 426/519; 426/660; 366/132; 366/142; 366/151.1; 366/152.1; 366/165.4; 99/348; 99/485; 99/486; 99/487; 99/493
[58] Field of Search .............................. 99/485, 348, 487, 99/468, 486, 452, 472, 470, 456, 457, 458, 459, 460, 461, 462, 477, 483, 493; 426/660, 519, 231, 631; 366/83, 84, 85, 86, 149, 290, 291, 297, 298, 299, 300, 301, 309, 194–196, 154, 155.1, 151.1, 152.1, 160.1, 162.1, 132, 142, 165.4; 356/346; 395/904, 906, 914

[56] References Cited

U.S. PATENT DOCUMENTS

| | | | |
|---|---|---|---|
| D. 359,635 | 6/1995 | Muntener | D6/450 |
| 4,560,563 | 12/1985 | Tresser | 426/101 |
| 4,587,894 | 5/1986 | Horig | 99/487 |
| 4,784,866 | 11/1988 | Wissgott | 426/262 |
| 4,865,856 | 9/1989 | Groen | 426/231 |
| 5,156,868 | 10/1992 | Muntener | 426/231 |
| 5,157,458 | 10/1992 | Wagner et al. | 356/351 |
| 5,215,771 | 6/1993 | Callebaut | 426/231 |
| 5,264,234 | 11/1993 | Windhab | 426/519 |
| 5,320,427 | 6/1994 | Callebaut | 99/348 |
| 5,332,588 | 7/1994 | Capodieci | 426/231 |
| 5,351,609 | 10/1994 | Muntener | 99/485 |
| 5,353,696 | 10/1994 | Stadelman et al. | 99/472 |
| 5,419,635 | 5/1995 | Schulte | 366/85 |
| 5,450,786 | 9/1995 | Muntener | 99/485 |
| 5,514,390 | 5/1996 | Aasted | 426/231 |
| 5,516,867 | 5/1996 | Leuthold | 426/231 |
| 5,525,364 | 6/1996 | Haslund | 426/231 |
| 5,532,022 | 7/1996 | Miller et al. | 426/660 |
| 5,554,409 | 9/1996 | Vezzani | 426/631 |

FOREIGN PATENT DOCUMENTS

3626732  2/1988  Germany .
9010191  9/1990  WIPO .

OTHER PUBLICATIONS

Minifie, Chocolate, Coca and Confectionary pp. 606–609, 1980.

Primary Examiner—Cynthia L. Nessler
Attorney, Agent, or Firm—Martin A. Farber

[57] ABSTRACT

In a method and an apparatus for refining chocolate mass within a trough, the trough contains at least one trough compartment wherein the chocolate mass is treated or conched. After entering the trough and after begin of operation of the machine, at least one additive, such as fat (cocoa butter), is added at a certain moment. Addition of the at least one additive is done into one compartment of the continuously operated conching machine. The composition of the chocolate mass is monitored after adding the additives by means of a spectrometer. An output signal of the spectrometer is used to control the added amount of the respective additive.

12 Claims, 1 Drawing Sheet

METHOD AND APPARATUS FOR REFINING CHOCOLATE MASS

FIELD OF THE INVENTION

The invention relates to a method for refining chocolate mass within a trough comprising at least one trough compartment wherein the chocolate mass is treated by known conching tools exerting a rheological shearing and mixing action. In such a conching process, at least one additive, such as lecithin, cocoa butter, milk or the like, is added to the cocoa containing mass at a certain moment after having begun the conching treatment.

The invention concerns also a conching arrangement comprising a conching machine for continuous operation which includes an inlet, at least one compartment for receiving said chocolate mass to be conched, and an outlet. Furthermore, at least one feeding device is provided to supply the at least one additive which has to be added in a metered amount to the cocoa containing mass (optionally containing already sugar or the like).

BACKGROUND OF THE INVENTION

A method of this kind has become known from U.S. Pat. No. 5,351,609. In this document, a continuous conching machine is described having a plurality of compartments. The addition of the ultimate amount of additives, such as milk powder or the like, is only done subsequently to the conching operation in at least two quasi-continuously working badge mixers that are alternately filled and discharged. The reason for using badge mixers is that the amount of additives can better be kept under control in such an operation. Of course, this will result in additional expenditure, since in addition to the conching machine, that would be able to admix the additives, not only the mixers have to be purchased, but have to be accommodated within the space available so that further two cost factors will arise. Therefore, it is an object of the invention to reduce the expenditure in an arrangement comprising a continuous conching machine.

This object is achieved by adding the additive into the at least one compartment of the conching machine, by monitoring the composition and proportion of the chocolate mass by means of a spectrometer after having added the additive, and by controlling the added proportion of the at least one additive by means of an output signal of the spectrometer indicating the actual proportion.

DETAILED DESCRIPTION OF THE DRAWINGS

Figure 1:
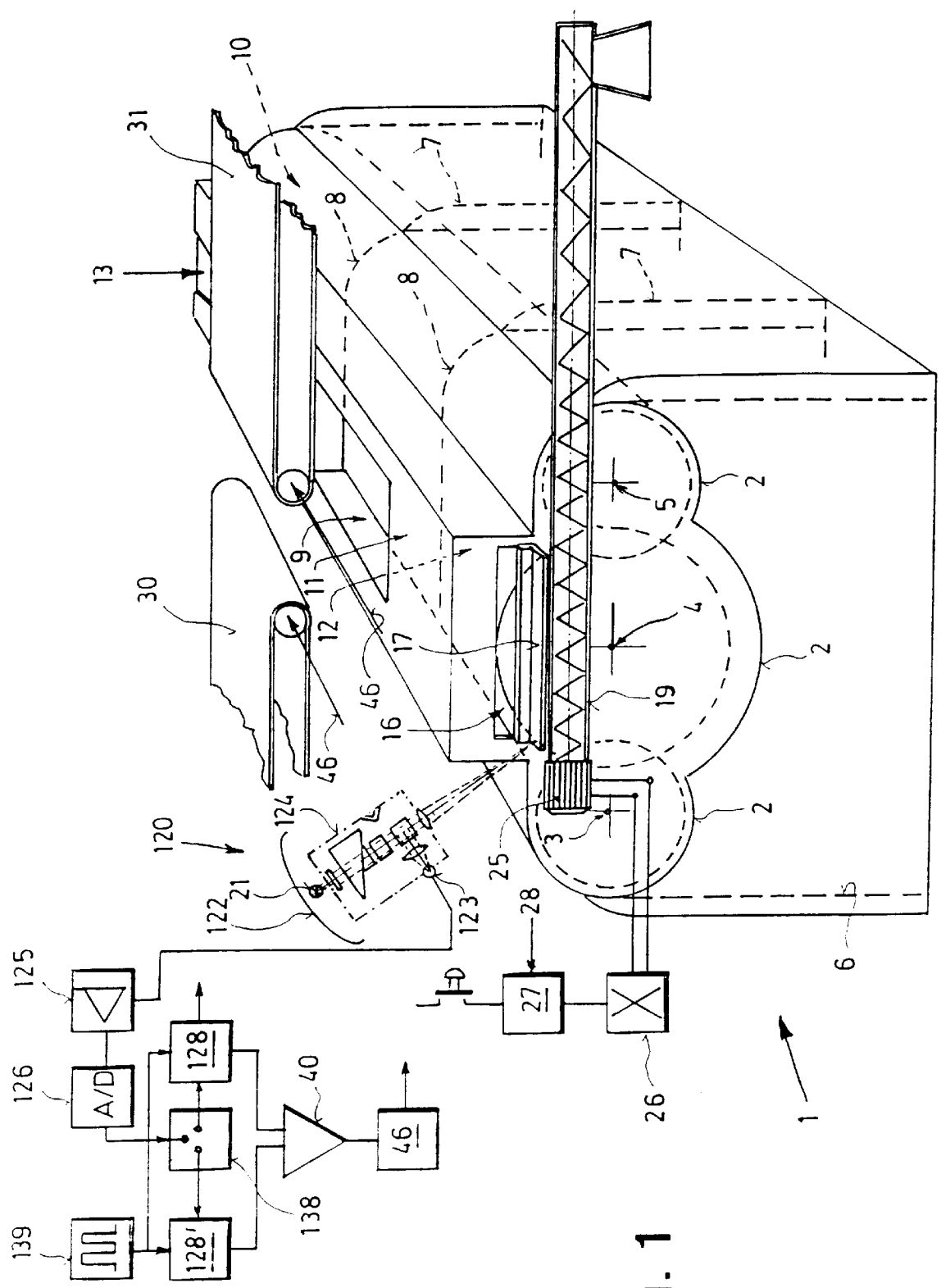
FIG. 1 is an oblique view of the invention.

The conching machine 1 shown in the drawing corresponds to a large extent to that described in U.S. Pat. No. 5,351,609, the contents of which shall be disclosed here by reference.

Accordingly the conching machine 1 has a trough 2 for receiving the cocoa containing mass or chocolate mass to be treated, i.e. conched. Three rotor shafts 3, 4 and 5, merely schematically illustrated, are rotatably supported within the trough 2. These rotor shafts 3, 4 and 5 comprise radially protruding scraping or shearing tools as known per se, mixing tools being assigned, if desired. The shape and function of these tools pertain to the prior art and can be seen, for example, from DE-A-36 26 732 where it is described that likewise less than three rotor shafts could be used.

At the outer side of the trough 2 a cooling or tempering jacket 6 is provided that is subdivided by partitions 7 into three sections or cooling circuits, independent from each other and optionally being separately controllable, particularly having each a closed loop temperature control. Analogously to the subdivided jacket 6, the trough 2 too is subdivided into three subsequent sections by partitions 8, the first section 10 being adjacent to a feeding opening 13 and forming, for example, a dry conching section, the subsequent section 11 being for treating the meanwhile plastic-pasty mass, and, optionally, a third section 12 being provided for treating the already liquid mass. In this procedure, the mass flows over respective overflow edges of the partitions 8 into the next compartment.

At the end of the conching machine 1, an overflow opening 16 is provided over which the chocolate mass flows out, for example over an out-flow sheet 17, for being conveyed further. The level of the overflow opening 16 may be somewhat lower than that of the overflow edge of the previous partition 8. Beneath the out-flow sheet 17, a screw conveyor 19 driven by a motor 25 may be provided.

Switching on the conching machine by means of parts 26–28 is effected the same way as described in U.S. Pat. No. 5,351,609.

A feeding opening 9 to the second compartment 11 is provided for adding fat (cocoa butter) and other additives, and an appropriate feeding device is assigned to it which in this embodiment is formed by two conveyor belts 30 and 31. These conveyor belts 30, 31 may preferably be formed as conveyor type weighers, but they may be common belt conveyors instead which are charged in a manner known per se, not discussed here in detail, with a desired proportion of the respective additive.

The out-flow sheet 17 provides in a favorable manner a flat surface for measurement of the chemical composition of the chocolate mass by a spectrometer 120. This spectrometer 120 corresponds preferably to an embodiment of a polarization-interferometer in accordance with WO-A-90/10 191 which is especially adapted for the intended purposes. With respect to its function and operation, the contents of this document shall be disclosed herein by reference. In substance, the issue is that the ACTUAL reflection spectrum is obtained from the respective material by a Fourier analysis, preferably by Fast-Fourier analysis, in order to compare it with at least one memorized NOMINAL spectrum. It will, however be understood that the present invention is not limited to the use of just this type of spectrometer, although this kind is particularly adapted for the present purposes due to its accuracy.

It should also be noted that, although the spectrometer 120 is shown as being arranged at the outlet of the conching machine, this is by no means necessary. Thus, a plurality of spectrometers could be used distributed over the path of the mass from the compartment 11 (or even 10 for comparison) to the outlet opening 16. Alternatively or in addition, optical guides, such as fiber optics, could be used to direct a (visible or invisible) light beam to the mass and for receiving a reflected optical signal from the mass, the signal containing an information about the mass' composition and the proportion of the cocoa containing mass and the additives. Therefore, the spectrometer may be located at a remote place and obtain this optical signal via the above-mentioned optical guides, in this way, however being assigned to the respective monitoring place, particularly to the outlet of the conching machine 1. Since such a spectrometer is relative expensive, a single one could be used in conjunction with a deviating device, such as a tilting mirror, so as to direct its beam alternatively through different optical guides to different places within the trough of the conching machine, for example to take the optical signals from compartment 10 in order to identify the composition of the cocoa containing main component and the related memorized NOMINAL spectrum.

For illumination, a single light source 21 is provided behind a housing 124 in such a way that a relative large reflector 122 creates a uniform light distribution over a certain area. The housing 124 supports the reflector 122 by cross-pieces not shown.

By means of the spectrometer 120, a chemical analysis of the components of the chocolate mass is enabled. It has already been mentioned that it would be possible to arrange further spectrometers (or outlets of light guides), for example, within the region of the feeding opening 13 or even before it, optionally also before the opening 9, in order to determine the chemical properties of the constituents fed into the conching machine 1, thus, determining the starting conditions. It is likewise possible to use either the signal of the measurement made at the outlet of the conching machine alone or in conjunction with that at the entrances 9 and/or 13 to determine the need of additives or any control measures as to the amount and proportion of such additives. Thus, it would be conceivable to establish the difference of both measurements and to use it for the control of added amounts, if necessary also of the cocoa containing mass fed into the opening 13.

At the output of an optical portion of the spectrometer 120, at least one photoelectric transducer 123 is provided receiving the light reflected from the chocolate mass which contains information about the proportions of its composition. The signal of this transducer is fed to an amplifier 125 from which it is supplied to an analogue/digital converter 126. The output of the latter is coupled to a switchover stage 138 over which the signal is selectively supplied either to a first processing and memorizing system 128 or to a second processing and memorizing system 128'.

Just with chocolate formulas, the corresponding spectra can be quite different according to the number and type of additives (fat, milk or milk powder, lecithine and so on), for which reason it may be advantageous first to provide a calibration step. To this end, a sample comprising a predetermined desired amount and proportion of additives may be presented to the spectrometer 120 on the sheet 17 prior to the real operation of the conching machine 1. Of course, it would be possible and is even convenient to take a plurality of such samples and to store their spectra as the NOMINAL spectra in a memory of the spectrometer 120. In any case, the signals obtained from the analysis and representing the respective spectrum taken are processed and memorized within the unit 128 by correspondingly switching the stage 138 over. For canceling the contents memorized before, a reset signal for canceling may be introduced via a reset input RS.

When the calibration procedure has been finished, the stage 138 is switched over so as to deliver the output signals of the spectrometer 120 to the unit 128' during normal operation of the conching machine 1. Memorizing and reading of data is effected under the control of a clock generator 139. Simultaneously with the supply of the ACTUAL data derived from the spectrometer 120 to the unit 128', this clock generator 139 provokes also reading of the NOMINAL data from the unit 128. In this way, the curves corresponding to a certain spectral distribution are, for example, read out point by point, and are compared with each other in a comparator 40 that subsequently gives a corresponding signal to a control stage 46. The latter is preferably formed by a processor system by which the two belt conveyors can be controlled. Other possibilities consist in applying chemometric methods or in the use of statistic weighing methods for weighing and sampling any difference detected by the comparator 40.

Controlling is suitably effected in such a way that the velocity of the belts 30, 31 is controlled as to obtain a continuous addition of the desired or needed additives. Alternatively, the supply may be effected first into a premixing vessel, that may be constructed in a relative simple and space saving way, and which has an outlet that is adjustable by means of a metering device controllable by the stage 46. It will be understood that, although two belt conveyors are shown, the feeding device is not restricted to a certain number or type of conveyors, but could be designed to feed only one additive in which case a pre-mixing vessel would certainly be superfluous.

Control carried out by the control stage 46 should preferably take into account that addition of the additives is effected in the trough compartment 11 so that, in a conching machine 1 including three compartments according to the present embodiment, the measurement by the spectrometer 120 is relative late, i.e. after the third compartment 12. One possibility could consist in providing a measuring facility (i.e. a spectrometer) within the region of the trough compartment 11, although this is difficult to do due to the risk of pollution. Therefore, the control stage 46 has, preferably, a proportional derivative (or differential) control characteristic (PD). Due to the large dimensions of a normal conching machine and the addition of the additives as shown, small irregularities of distribution of additives could be possible which could lead to an overreaction of the system, and, therefore, it may be convenient to have a proportional derivative plus reset (PID) control characteristic so as to integrate the errors due to these small irregularities. The derivative or differential proportion of the control signal or its characteristic will result in an early indication of changes of the components' proportions and of the tendency of such changes in feeding the additives.

Although a special conching machine is shown in the drawings, the invention is not limited to this type of machine, since other continuous conching machines, for instance with a single trough, vessel or compartment, have become known where this invention can likewise be applied.

What is claimed is:

1. A method for refining chocolate mass within a trough including at least one compartment wherein the chocolate mass is treated and to which at least one additive is added after beginning such treatment, the method comprising continuously feeding cocoa containing mass to a conching machine having an inlet, said at least one compartment and an outlet;

adding said at least one additive into said compartment to provide a chocolate composition of a desired proportion of said cocoa containing mass and said additive;

monitoring said proportion by means of at least one spectrometer after said step of adding, said spectrometer taking an optical signal from said mass and said at least one additive and providing an output signal representative for said proportion;

controlling the amount of said at least one additive during said adding step using said output signal.

2. Method as claimed in claim 1, wherein a polarization-interferometer is used as a spectrometer.

3. Method as claimed in claim 1, wherein said optical signal is subjected to a Fourier analysis.

4. Method as claimed in claim 3, wherein said Fourier analysis is a Fast-Fourier analysis.

5. Method as claimed in claim 1, wherein said spectrometer is assigned to the outlet of said conching machine.

6. An apparatus for conching chocolate mass, the apparatus comprising a conching machine for continuous operation including an inlet, at least one compartment for receiving said chocolate mass to be conched, and an outlet;

at least one feeding means for feeding at least one additive into said compartment;

at least one spectrometer means for determining the amount of said at least one additive in said mass, said spectrometer delivering an output signal representative for the amount of additive within said mass; and metering means for determining the amount of additive fed by said feeding means, said metering means including control means for receiving said output signal to maintain a desired nominal amount of said additive.

7. Apparatus as claimed in claim 6, wherein said spectrometer is a polarization-interferometer.

8. Apparatus as claimed in claim 6, wherein said spectrometer comprises means for carrying out a Fourier analysis.

9. Apparatus as claimed in claim 8, wherein said spectrometer comprises means for carrying out a Fast-Fourier analysis.

10. Apparatus as claimed in claim 1, wherein said spectrometer is assigned to the outlet of said conching machine.

11. Apparatus as claimed in claim 1, wherein said control means have a derivative or differential characteristic.

12. Apparatus as claimed in claim 11, wherein said control means comprise a proportional derivative plus reset (PID) control characteristic.

* * * * *